April 25, 1933.   J. R. WHITTLES   1,905,080
HYDRAULICALLY ACTUATED TABLE RECIPROCATING MECHANISM
Filed Dec. 30, 1930
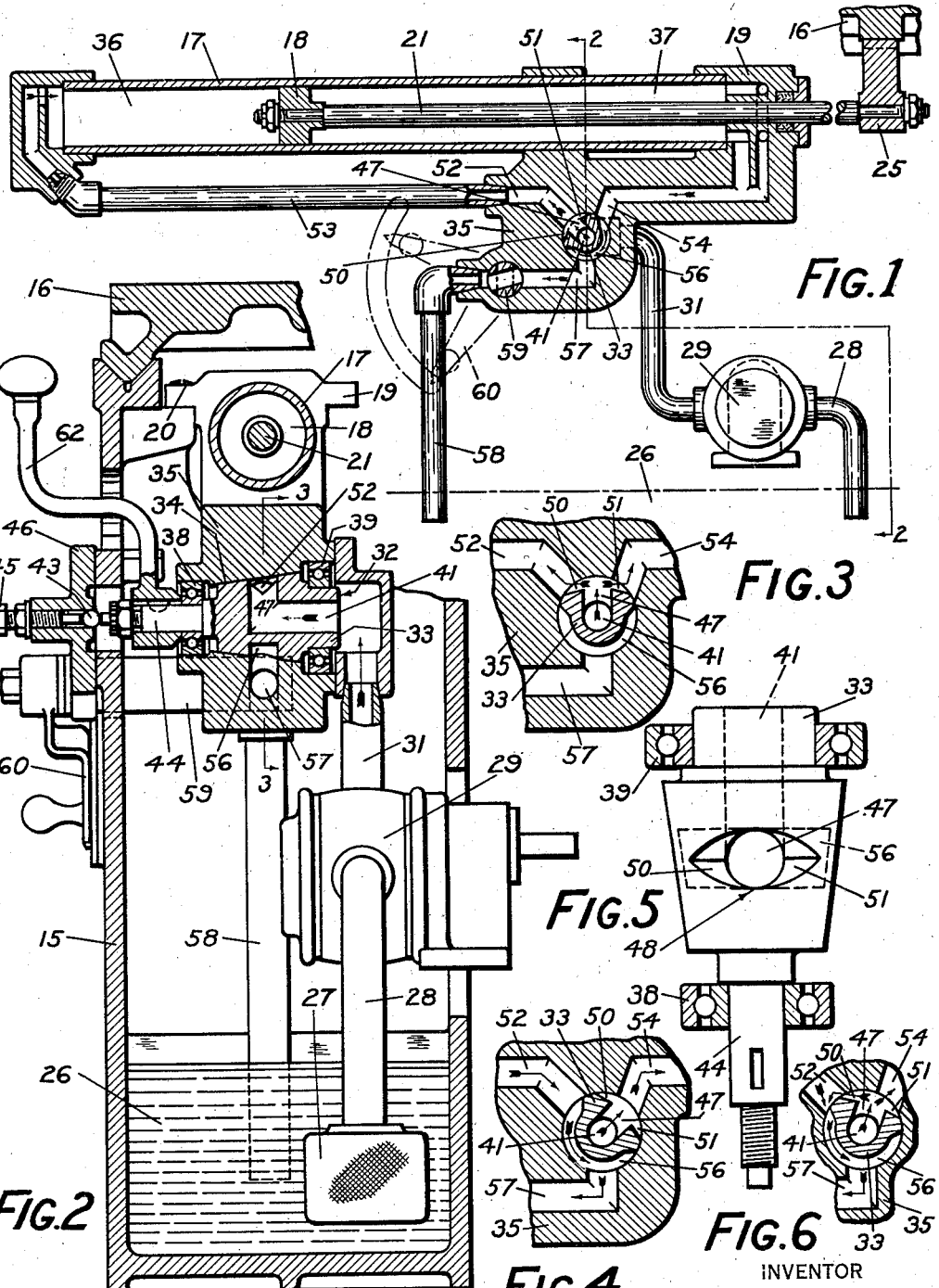
INVENTOR
JOSEPH R. WHITTLES
BY
ATTORNEY
WITNESSES
Franklin E. Johnson
Harold W. Eaton Patented Apr. 25, 1933

1,905,080

UNITED STATES PATENT OFFICE

JOSEPH R. WHITTLES, OF ROCKFORD, ILLINOIS, ASSIGNOR TO NORTON COMPANY, OF WORCESTER, MASSACHUSETTS, A CORPORATION OF MASSACHUSETTS

HYDRAULICALLY ACTUATED TABLE RECIPROCATING MECHANISM

Application filed December 30, 1930. Serial No. 505,661.

This invention relates to a machine tool and more particularly to a fluid pressure system including a reversing valve for reciprocating a machine tool table.

In the modern machine tool, production is the major factor and it is essential that the parts move as rapidly as possible consistent with the efficient operation of the machine. In rapidly reciprocating a machine tool part, the reversal of the mechanism is a source of trouble, since any sudden change in the direction of application of power to the table results in shocks and vibrations being transmitted to the movable support. Heretofore various fluid pressure systems have been developed for traversing and reciprocating machine tool parts. These systems have in most cases been of complicated constructions having numerous valves to obtain the desired table movement.

It is one object of this invention to provide a simplified fluid pressure system for traversing or reciprocating a table which is arranged so that the table may be reciprocated at a rapid rate and the reversal in direction of movement accomplished with a minimum vibration of the parts.

It is a further object of this invention to provide an improved reversing valve which is arranged so that at reversal, fluid is gradually cut off from one side of the system and by-passed to the exhaust port, while its flow is gradually increased on the other side.

It is still a further object of this invention to provide an improved reversing valve in which fluid under pressure is admitted at the base of a conically shaped member to seat the valve and the movable part is supported by anti-friction bearings so as to minimize the friction of the parts in operation.

Other objects will be readily apparent from the following disclosure. One embodiment of this invention has been illustrated in the drawing, in which like reference numerals indicate like parts:

Fig. 1 is a fragmentary diagrammatic sectional view showing the arrangement of the valve and other parts of the fluid pressure system;

Fig. 2 is a fragmentary cross sectional view through a machine, on an enlarged scale, taken approximately on the line 2—2 of Fig. 1;

Fig. 3 is a fragmentary sectional view, taken approximately on the line 3—3 of Fig. 2, showing the reversing valve in a neutral position;

Fig. 4 is a similar fragmentary view showing the reversing valve turned so as to admit fluid through the right-hand cylinder chamber to move the piston toward the left, as viewed in Fig. 1;

Fig. 5 is a detail view on an enlarged scale of the reversing valve; and

Fig. 6 is a fragmentary sectional view of the valve showing the part in a partially reversed condition.

A table reciprocating mechanism, such as a fluid pressure mechanism, is provided to reciprocate the machine tool table at a rapid rate. As illustrated in the drawing, the table 16 is reciprocated on a base 15 by a fluid pressure mechanism including a cylinder 17 and a piston 18. The cylinder 17 is fixed to the base 15 by a bracket 19 and screws 20. The piston 18 is connected by a rod 21 to a depending bracket 25 on the under side of the table 16. It will be readily appreciated from this construction that if fluid is admitted to one end of the cylinder, a corresponding movement will be transmitted to reciprocate the table. Fluid may be supplied by any suitable fluid pressure system, but in the preferred construction fluid is drawn from a reservoir 26 in the base 15, through a strainer 27 and a pipe 28 by a pump 29. The pump 29 forces fluid under pressure through the pipe 31 and a reversing valve 32 to a cylinder chamber 36 or to a chamber 37, depending upon which direction it is desired to move the table.

In accordance with my invention, I provide a fluid pressure controlling device which includes a reversing valve, and preferably one of the rotary type, through which the fluid flows to two passages connected with opposite ends of a cylinder to admit fluid on opposite sides of a piston, the valve being so arranged that movement thereof causes the flow of fluid under pressure to one side of the piston to be gradually checked as fluid is gradually admitted to the other side of the piston. In this way, the movement of the table is gradually retarded until it is brought to a stop, when the valve is in a neutral position with the fluid pressure equal on opposite sides of the piston, thus maintaining a balanced condition in the fluid pressure system. Thereafter, the continued movement of the valve, which may be accomplished by hand or a load-and-fire mechanism, causes the fluid pressure to start the table gradually in the opposite direction. At the same time an exhaust port is opened by the valve, permitting fluid to escape from that end of the cylinder filled during the former table movement.

The preferred construction of the reversing valve is of a rotary type in which the rotary member is provided with an enlarged feed passage or port having two opposed V-shaped portions tapering outwardly or with their apexes extending in opposite directions. The V-openings are so arranged in the rotary member in relation to the feed passages in the valve casing which extend to opposite ends of the cylinder, that flow of fluid may be gradually reversed so as to reverse the table movement without undue shocks and vibrations. The rotary member is also provided with an exhaust passage or groove, communicating with an exhaust port in the casing, the groove being so arranged relative to the V-shaped portions that when the valve is moved to a reverse position, fluid will be gradually cut off from one of said passages as it is gradually admitted to the other and will also be by-passed through one of the V-shaped portions to the exhaust groove before the valve member reaches its final reversed position.

As a further feature of my invention, the reversing valve is so constructed that the rotary member is held seated by fluid under pressure and is rotatably mounted in antifriction bearings so that it may be reversed with a minimum amount of effort either manually or automatically as desired. This valve comprises a rotary member 33 which is preferably frusto-conical in shape and is adapted to fit within a correspondingly shaped aperture 34 in a valve casing 35. To minimize the wear between the rotary member 33 and the casing 35, and also to provide an easily rotated valve member, anti-friction bearings 38 and 39 are interposed between the ends of the valve 33 and the valve casing 35. The valve is provided with a central aperture 41 through which fluid enters from the pipe 31. It will be readily appreciated that the pressure of the fluid entering at the base of the conical member tends to seat the valve and maintain it in proper relation with the valve casing 35. To permit adjustment of and to minimize the friction between the valve 33 and casing 35, a ball end thrust 43 is provided between the valve stem 44 and the frame of the machine. An adjusting screw 45 is mounted in a plate 46 on the base 15 and arranged to contact with the ball 43. By adjusting the screw 45, the position of the ball 43 may be varied so that the rotary valve 33 may be maintained in proper relation with its casing 35.

The central aperture 41 of the valve 33 has an upwardly projecting passage 47 which extends to the peripheral surface of the valve. At the intersection of the passage 47 and the frusto-conical surface of the valve 33 is an enlarged port 48 having V-shaped portions 50 and 51 with their apexes extending in opposite directions. The port 48 is arranged so that it may be turned to pass fluid under pressure through a passage 52, a pipe 53 into the chamber 36 to move the piston 18 and the table 16 toward the right as viewed in Fig. 1, or to pass through a passage 54 into the cylinder chamber 37 to move the piston 18 and table 16 toward the left as viewed in Fig. 1. The oppositely extending V-portions 50 and 51 are provided so that when the reversing valve 33 is turned to change the direction of travel of the table, the fluid flow is gradually reduced and cut off from one side of the system, as it is admitted and gradually increased on the other side, thereby producing an easy reversal of the table. The V-ports 50 and 51 are so arranged that, when the valve 33 is in a neutral or central position (Fig. 3), they are in communication with the passages 52 and 54 respectively so that fluid under pressure is admitted on each side of the piston, and the work table is held stationary due to the equalized pressure on opposite sides of the piston.

An exhaust groove 56 is provided in the periphery of the valve member 33, extending from a point adjacent to the apex of V 50 to a point adjacent to the apex of V 51. The V-portions 50 and 51 and the exhaust groove 56 are so arranged relative to each other that when the valve 33 is moved in a clockwise direction beyond the neutral position (Fig. 3) during reversal, that fluid passing through the passage 54 is gradually increased and is gradually decreased through passage 52 until the valve reaches the position indicated in Fig. 6. When valve 33 reaches this position fluid under pressure passing through V 50 into passage 52 will by-pass into exhaust groove 56 and through exhaust port 57, pipe 58 and return to reservoir 26. The fluid under pressure within chamber 36 is also free to exhaust through groove 56 and port 57 and the fluid under pressure passing through V 51 and passage 54 starts the table gradually in the reverse direction. The movement of the table accelerates until the valve 33 reaches the position illustrated in Fig. 4 with the port 48 aligned with passage 54 and passage 52 aligned with exhaust groove 56 so that the table traverses at its normal speed.

Similarly when valve 33 is moved from the position as shown in Fig. 4 into the position indicated in Fig. 1, fluid under pressure will be gradually cut off from passage 54 and gradually admitted and increased through passage 52 so as to reverse the direction of travel of the table without undue shocks and vibrations.

Speed control

In order that the speed of the work table may be varied to give the desired grinding action, a throttle valve 59 is provided so that the speed of the table 16 may be readily adjusted. The valve 59 is preferably located in the exhaust side of the system between the port 57 and a pipe 58, so that there is a constant pressure on the intake side of the system and the speed of travel of the table is definitely controlled by throttling the exhaust of fluid pressure passing through the port 57. The valve 59 is controlled by a lever 60 which is mounted on the front of the machine base so that the operator may readily adjust the speed of movement of the work table 16.

Reverse valve actuating mechanism

The reversing valve 33 may be actuated manually, or it may be arranged for automatic actuation, by any well known construction, such as adjustable dogs on the machine table which actuate a load-and-fire mechanism connected to shift the valve. However, for the sake of simplicity of illustration, a manually operable control has been shown. This comprises a lever 62 which is keyed to the stem 44 of the valve 33 and projects from the front of the machine base. It will be readily apparent that by manipulation of the lever 62, the valve 33 may be shifted from a neutral position, such as shown in Fig. 3, with the table held in a fixed position, to a position shown in Figs. 1 or 4 so that fluid may be admitted to either end of the cylinder to transmit a corresponding movement to the machine tool table.

Having thus described my invention, what I claim as new and desire to secure by Letters Patent is:

1. In combination with a fluid pressure motor having a cylinder and piston for reciprocating a machine table and end ports in the cylinder, a reversing valve connected with said ports comprising a casing having a chamber for a rotary valve, an axial inlet port and three peripheral ports opening through the casing to the chamber, one of which ports serves as an exhaust and the others serve for feeding fluid to the motor, a rotary valve within the chamber having an axial bore communicating with the inlet port, a feed passage in said valve extending from the bore to the periphery and having its opening at the periphery so shaped and arranged that, when the valve is in a neutral position, it may communicate with both feed ports to balance the pressure on both sides of the piston and at the same time prevent exhaust of fluid from either end of the cylinder, an exhaust passage on the opposite side of the valve from the feed groove and spaced therefrom by walls, but which is so arranged that it may connect either feed port with the exhaust port, each of said walls being narrower than the width of either feed port so that when the valve is moved from a neutral to a reverse position, part of the fluid may by-pass in a gradually decreasing amount from the feed groove through one of the feed ports into the exhaust passage and cause a gradual acceleration of the piston.

2. In combination with a fluid pressure motor having a cylinder and piston for reciprocating a machine table and end ports in the cylinder, a reversing valve connected with said ports comprising a casing having a chamber for a rotary valve, an axial inlet port and three peripheral ports opening through the casing to the chamber, one of which ports serves as an exhaust and the others serve for feeding fluid to the motor, a rotary valve within the chamber having an axial bore communicating with the inlet port, an elongated peripheral feed groove and a radial passage communicating with the bore, said feed groove being of such length that, when the valve is in a neutral position, it may communicate with both feed ports to balance the pressure on both sides of the piston, an elongated peripheral exhaust groove on the opposite side of the valve from the other groove and spaced therefrom by end walls, but which is of such length that it may connect either feed port with the exhaust port, each end wall being narrower than the width of either feed port so that when the valve is moved from a neutral to a reverse position, part of the fluid may by-pass in a gradually decreasing amount from the inlet port to the exhaust port and cause a gradual acceleration of the piston.

Signed at Holden, Massachusetts, this 29th day of Dec. 1930.

JOSEPH R. WHITTLES.